United States Patent [19]

Holman et al.

[11] Patent Number: 4,788,406

[45] Date of Patent: Nov. 29, 1988

[54] MICROATTACHMENT OF OPTICAL FIBERS

[75] Inventors: Robert L. Holman, Powell; Doyle P. Skinner, Jr., Westerville; Lynda M. Johnson, Worthington, all of Ohio

[73] Assignee: Battelle Memorial Institute, Columbus, Ohio

[21] Appl. No.: 6,164

[22] Filed: Jan. 23, 1987

[51] Int. Cl.[4] .................................. B23K 11/00
[52] U.S. Cl. .......................... 219/113; 219/56.22; 350/96.2
[58] Field of Search ............ 219/56.21, 56.22, 85 CA, 219/85 CM, 113; 350/96.2, 96.21, 96.23

[56] References Cited

U.S. PATENT DOCUMENTS

| | | | |
|---|---|---|---|
| 3,263,057 | 7/1966 | Conti | 219/56.21 |
| 3,297,855 | 1/1967 | Bowers | 219/56.21 |
| 4,326,117 | 4/1982 | Kanne, Jr. et al. | 219/85 CM |
| 4,557,557 | 12/1985 | Gleason et al. | 350/96.2 |
| 4,615,031 | 9/1986 | Eales et al. | 350/96.2 |
| 4,708,431 | 11/1987 | Pikulski et al. | 350/96.2 |

*Primary Examiner*—Clifford C. Shaw
*Attorney, Agent, or Firm*—Robert B. Watkins; Philip M. Dunson

[57] ABSTRACT

One or more optical fibers are attached to an optical component element or supporting substrate by coating the peripheral surface of the optical fiber with a metallic layer and then positioning the metallic layer in electrical contact with a metal surface of the object along an interface. An electrical current pulse or pulses is applied through the interface sufficient to cause local melting or near melting and welding at the interface.

21 Claims, 4 Drawing Sheets

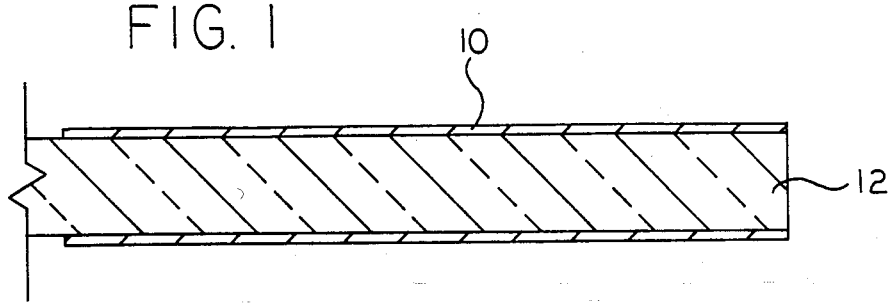
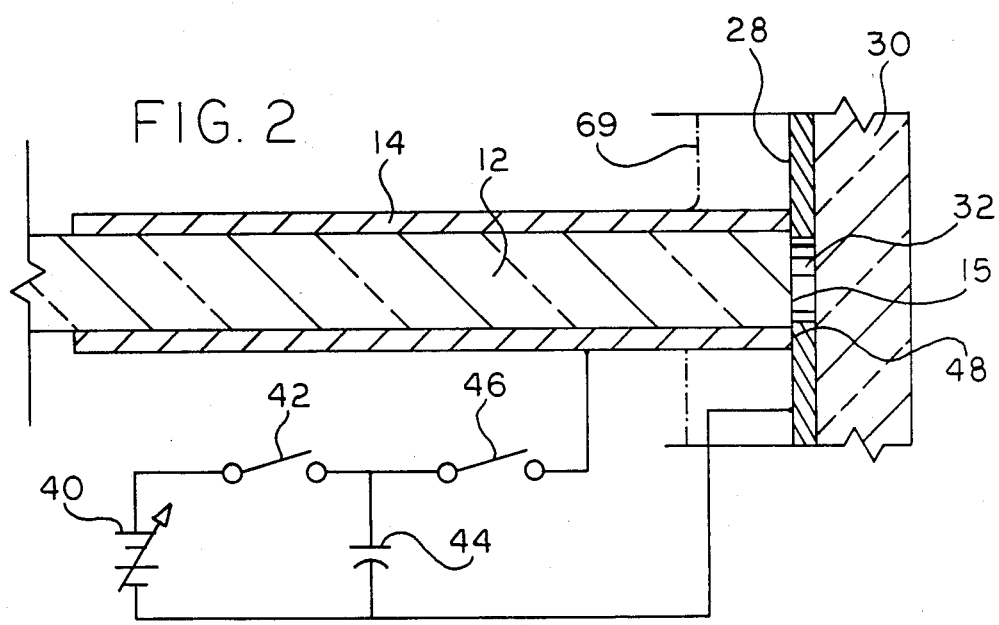
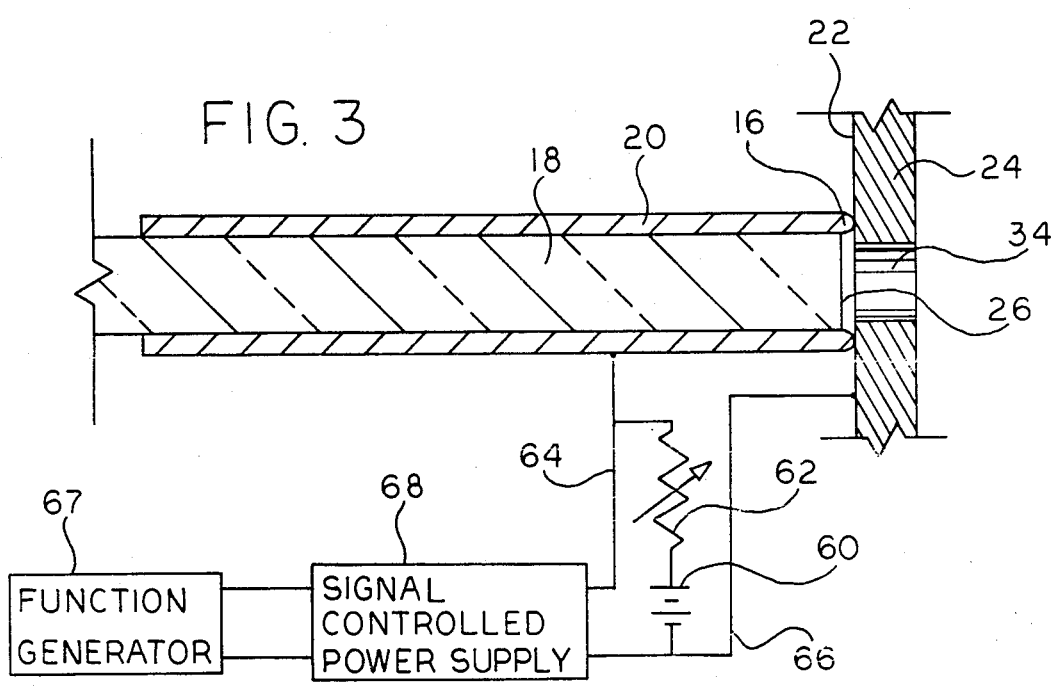

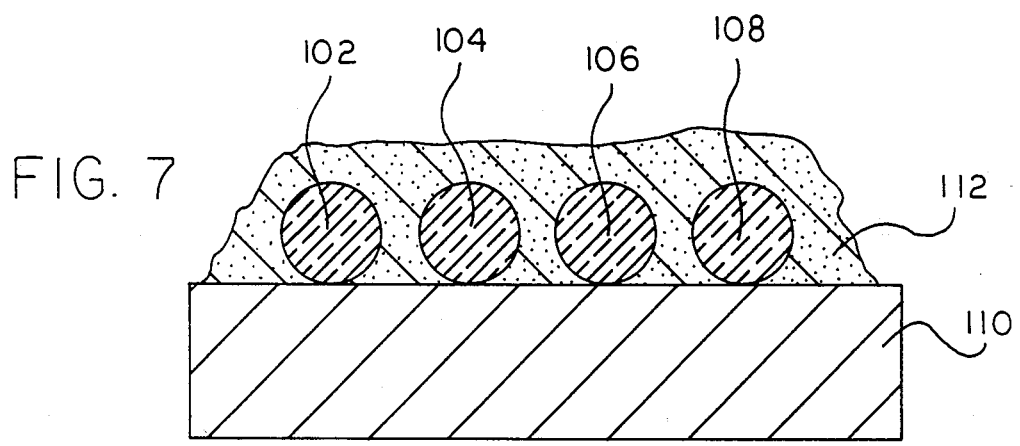
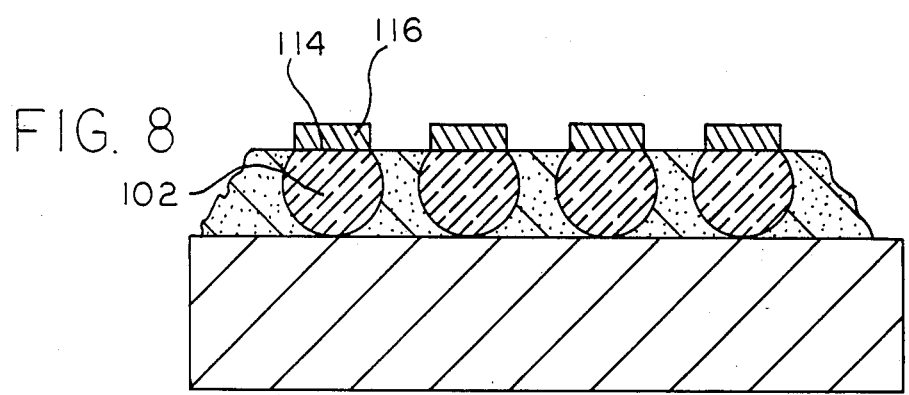
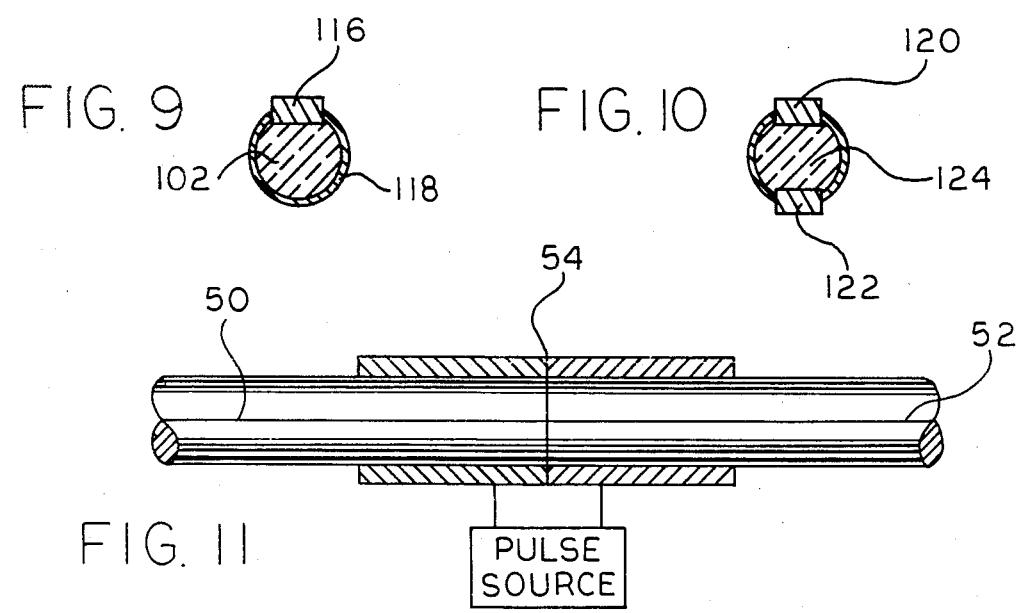

MICROATTACHMENT OF OPTICAL FIBERS

TECHNICAL FIELD

This invention relates generally to the fabrication of optical and optoelectronic devices and more particularly relates to attaching one or more light-transmitting, optical fibers to other components in a manner which provides a secure, durable and accurate physical connection while maintaining high efficiency light coupling between the fiber and the component. The invention is useful in optical systems, including fiber optic sensors, semiconductor lasers, GRIN rod lenses, micro-lenses, integrated optic wave guides, semiconductor microelectronic circuits, and photo-diode detectors and is suitable for automated assembly.

BACKGROUND ART

Both single mode and multimode optical fibers must be connected to each other and/or to other optical elements to provide an optical signal path. The fibers must be accurately positioned with respect to the other optical elements in order to promote efficient light coupling between optical elements so that optical devices will be practical. Further, the intersecting, relative positions and the alignment of the fibers must be durably maintained in order to provide reliable devices as the devices can encounter a broad range of environmental stresses and fluctuations. In some applications the exact position of the fiber's endface must be maintained with respect to each of the six possible degrees of motion which are X, Y and Z positions in three-dimensional space and motions of roll, pitch and yaw. Some applications require not only that the position of the fiber's endface be maintained, but also that its longitudinal, peripheral surface extending from the endface be maintained in a constant position with respect to other surfaces.

Optical fibers have been attached to other optical elements in a variety of ways well known in the art. These include the use of ultraviolet cured adhesives, laser fusing, soldering, and mechanical structures. Microetched, grooved surfaces have been used in conjunction with UV cured adhesives to fix the fiber in place. Metal coated and uncoated fibers have been aligned while surrounded in molten solder. The solder is cooled and solidified after the desired alignment is obtained. This approach has also been used for UV cured adhesives. A soldering technique is illustrated in U.S. Pat. No. 4,033,668.

Any single mode attachment method is difficult because the positional tolerances are so small, on the order of tenth's of microns, and this is particularly so when it is necessary to accomplish the repetitive alignment and bonding of optical fibers in side by side relationship to form an array.

Organic adhesives are difficult to dispense with reproducable uniformity, quantity and distribution. Organic materials degrade at relatively low temperatures and outgassing of organic materials can affect the performance of other components. Some organic materials are slow to set or cure.

Laser fusing can be adapted to the bonding of one fiber at a time but generates severe thermal gradients that can alter fiber alignment and even damage other optical elements. Thermal fusion of the fiber to a glass support is less adaptable to the bonding of one fiber at a time and also creates thermal disturbances which can alter fiber alignment. The soldering of uncoated and metal coated fibers may be satisfactory for a single fiber, but is difficult to apply to an array of fibers that must be fixed precisely one fiber at a time. Use of structures with mechanical grooves to guide the alignment of the fibers prior to a broad area bond is possible but has limited application and is highly susceptible to manufacturing and tolerance errors.

BRIEF DISCLOSURE OF INVENTION

In the present invention an electrical current pulse is applied through an interface of electrical contact between a metal coated optical fiber and a metallic surface of another optical element.

More particularly, in the present invention an optical fiber is coated over at least a portion of its periphery with a metallic layer to an end of the optical fiber. The metallic layer of the optical fiber is then positioned in electrical contact with a metal surface of the other metal-coated optical element along an interface. A sufficient electric current in the form of a pulse or pulses is then applied through the interface to cause local melting at the interface and subsequent welding. The current may be applied, for example, by the discharge of a capacitance to supply a selected quantity of energy to the interface or by a series of specifically shaped pulses.

BRIEF DESCRIPTION OF DRAWINGS

FIG. 1 is a view in longitudinal section of an end portion of an optical fiber upon which an initial thin film of metal has been deposited.

FIG. 2 is a view in longitudinal section of a fiber upon which a thicker metal has been plated and which is positioned and connected for welding in accordance with the present invention.

FIG. 3 is a view in longitudinal section of a fiber having an alternative structural feature and alternative circuitry.

FIGS. 7, 8, 9, and 10 are lateral sections which illustrate an alternative embodiment of the invention.

FIG. 11 is a view in longitudinal section illustrating yet another alternative embodiment of the invention.

Figure 4:
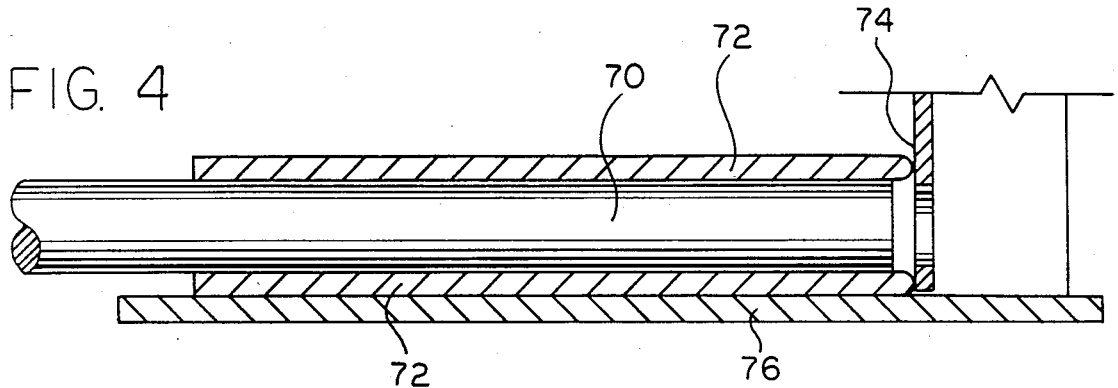
FIG. 4 is a view in longitudinal section of a fiber in position for connection and in an alternative embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

In the present invention a metal layer, which may be elemental metal, an alloy, or a layered combination is coated on one or more optical fibers and upon an optical device, if the device is not metallic, so that the metallic surfaces can be brought into electrical contact along an interface and a pulse of electrical current is then applied through the interface which is sufficient to cause local melting and welding at the interface. The thin metal films are welded together to rigidly support the optical fiber and the object to which it is connected in a fixed, relative position. Fibers may be connected in this manner to both optical and non-optical objects and may be connected either around the endface of a fiber or along a longitudinal portion of the periphery of the metal layer formed on the periphery of the optical fiber.

Referring to FIG. 1, in a preferred embodiment of the invention a preliminary, relatively thinner layer of metal is initially deposited on a fiber 12 by any one of the many physical or chemical metal deposition methods which are known in the metal deposition art. This initial layer 10 has a thickness in the range of 10 Angstroms to 7,500 Angstroms and typically has a thickness near the upper end of this range, e.g. 5000 Angstroms.

An additional metallic layer is then plated over the deposited layer 10 to form a final metallic layer 14 coated on the surface of the fiber which has a total thickness substantially in the range of 1 micron to 50 microns.

In order that light will be coupled from the fiber to a device connected to the fiber, the endface of the fiber must be free of the metal coating at its central core. For example, if the initial, relatively thin layer 10 is made thicker by means of electroplating, the fiber can be cleaved or polished to provide a flat endface before, during or after electroplating. If the end face preparation is performed after electroplating, a follow-up electroplating procedure may be applied to polish the exterior surface of the metallic layer on the fiber and/or to provide a lip or rim 16 as illustrated in FIG. 3.

One preferred method for forming a slightly protruding metal lip involves pressing the fiber's endface tightly against a suitable mechanical flat surface while submerged in the appropriate electroplating solution. Electroplating proceeds to build up the coating thickness without lip formation. When suitable coating thickness has been produced, the fiber can be raised a calibrated amount, and plated further, forming the lip of desired dimension. Alternately, the fiber can be lifted from the "flat" and the electroplating process can proceed for a calibrated period of time at a pre-determined plating current. Or, the fiber endface, including surrounding metal coating can be batch polished to a flat face then the fiber can be returned to the electroplating bath for a short treatment to form a lip.

In this manner the peripheral metallic layer 14, which is formed around the peripheral surface of the optical fiber 12, extends longitudinally beyond the endface of the fiber to form a lip, such as the lip 16, on the optical fiber 18 of FIG. 3.

This annular lip or rim 16 assures good electrical contact between the end of the metallic layer coating 20 in FIG. 3 and a surface 22 of a metal or metal coated object 24 to which the fiber is to be attached. The rim or lip 16 also provides a small and controllable separation between the fiber endface and the object to which it is attached. Typically the rim or lip 16 extends beyond the endface a distance less than 1 micron at initial contact. This distance may be made to be zero if the fiber is physically advanced forward during the discharge melting process.

Therefore, the thin metallic layer which is formed on the fiber may extend beyond the endface 26 of the fiber 18 so that the endface is spaced at a fixed position and orientation with respect to the object 24. In the alternative, the metallic layer 14 may be flush with the endface 15 of the fiber 12 as illustrated in FIG. 2 so that the fiber endface is essentially co-planer with the metal surface 28 of the object 30. Conveniently a force may be applied to the fiber having a component along the fiber axis to thrust the end of the fiber and its metallic layer into contact with the object to which it is to be connected.

As illustrated in FIG. 2 and in FIG. 3, when the fiber is connected to an object which is provided with a small opening, such as the opening 32 in FIG. 2 or the opening 34 in FIG. 3, the endface is positioned in registration with the opening and welded in accordance with the present invention so that light in the fiber can be coupled through the opening to the metal coated optical object without excess light loss.

A simple method of supplying the electrical welding current is with a capacitive discharge circuit such as illustrated in FIG. 2. A power source 40 is connected through a charging switch 42 to a capacitor 44. The capacitor may, for example, be 11,000 microfarads. The capacitor is initially charged by closing the charging switch 42 until the voltage on the capacitor equals the voltage of the source 40. The charging switch 42 is then opened.

The welding operation may then be initiated in one of two different ways. In one way the metallic layer of the coated fiber is brought into contact with the metal surface of the object to which it is connected. Thereafter a discharge switch 46 is closed to initiate the flow of current, discharging the capacitor 44 and causing heating and melting at the annular interface 48 because of the resistance of the electrical contact. Alternatively, the capacitor 44 may be charged and the discharge switch 46 closed, or replaced by a permanently closed conductor before the metallic layer 14 on the fiber 12 is positioned in electrical contact with the metallic surface 28 of the object 30 to which it is to be connected. Thereafter the optical fiber 12 is properly aligned and moved into mechanical contact with the object. The making of electrical contact between the metallic layer 14 and the surface 28 will allow current flow and the capacitor will be discharged to complete the weld operation.

Instead of using capacitance discharge, alternative conventional electronic switching methods may be utilized to apply a current pulse through the contact interface. Conventional function generator and pulse generator circuit techniques can be utilized to apply a current pulse having a selected duration, amplitude and, if desired, time varying characteristic. For example, the current pulse may be a rectangular pulse or a pulse of another shape to provide a desired electrical energy characteristic over the pulse duration. FIG. 3 illustrates the connection of a function generator 67 to control the output of a power supply 68.

As yet another alternative embodiment, a plurality of current pulses may be applied in sequence through the interface. These pulses may be identical to each other or may be different to tailor the formation of the weld. As one example, the first current pulse may be relatively smaller, that is, of lesser energy or amplitude than a subsequent current pulse so that the fiber is initially "tacked" to the object and then subsequently more securely bonded by the application of higher current pulses. This technique may, in some conditions, minimize or prevent molten metal "splatter" during the weld operation.

A preferred way of supplying the electrical welding current is with a computer controlled circuit. In this manner a single pulse, or a train of pulses of any desired shape may be applied. The elevated temperature distribution at the fiber tip can be optimized for the specific dimensions and materials involved. For example, two current pulses, the first long and relatively low in current (e.g. 5A, 20 ms), the second and immediately following short in time and high in current (e.g. 10A, 5 ms) can be applied. In this case the first pulse "warms" the interface and the second causes rapid, very localized melting. This combination is very suitable for gold and gold/indium. Other combinations may yield improved results or be more suited to other conditions.

As illustrated in FIG. 11, these same techniques described above may be utilized to join one fiber 50 to a second fiber 52 along a seam 54. In this embodiment the second fiber is effectively the object to which the first fiber is attached in accordance with the principles of the present invention.

In conventional resistance heating techniques, an electrical current is passed through a metallic conductor to heat the metal. In the present invention, as illustrated in FIG. 3, an electrical current may be passed through either the metallic layer formed on the fiber or the metallic layer or metal of the object to which the fiber is to be attached or through both. This resistance heating current is sufficient to heat the metal, but not to heat it to its melting temperature. The welding pulse of the present invention is then applied. In this manner the metal may be preheated, after which the pulse is applied. The welding pulse may be applied simultaneously while the resistance heating current is applied or afterward.

FIG. 3 illustrates such a resistance heating circuit consisting of a source 60, series connected to a variable resistance 62 and connected through the existing conductors 64 and 66 to the metallic layer 20 and the metal surface 22.

After completion of the welding operation in accordance with the present invention, a bonding agent 69 illustrated in FIG. 2 may, alternatively, be coated over the weld, over a portion of the fiber metallic layer adjacent the weld, and over a portion of the surface of the object adjacent the weld in order to strengthen and reenforce the mechanical bond which was previously formed by the welding operation.

The present invention may also be utilized to attach a metal-coated optical fiber to a planar or other surface longitudinally along a portion of the periphery. Referring to FIG. 4, for example, an optical fiber 70 upon which a metallic layer 72 is formed as described above, is aligned and brought into contact with a metallic surface 74 and welded to it in the manner described above. The electrical pulse utilized to form this weld need only be sufficiently large to initially tack the fiber in its proper physical position with respect to the metallic surface 74. Thereafter a durable, rugged bond may be formed by performing the same weld operation, applying a pulse between the metallic layer 72 and a metallic support plate 76 which is brought into electrical contact with the metallic layer 72. The weld bond along the interface between the metallic layer 72 and the plate 76 is considerably stronger because of its substantially greater interfacing surface area. The tack bond initially holds the fiber endface in proper position with respect to the optical element and the second bond affects the stronger, larger area to rigidly secure or anchor the fiber to the support structure. The relatively smaller tack weld has considerably less affect upon and is considerably less likely to disturb the mechanical positioning and cause the fiber to deviate appreciably from its desired position.

A single fiber or a plurality of fibers forming an array may also be bonded in this manner to a single plate. The fibers can be bonded in accordance with the present invention on a single plate, sandwiched between two parallel plates or bonded on the contoured surfaces of a disk, cylinder or other geometrical surface.

Figure 5:
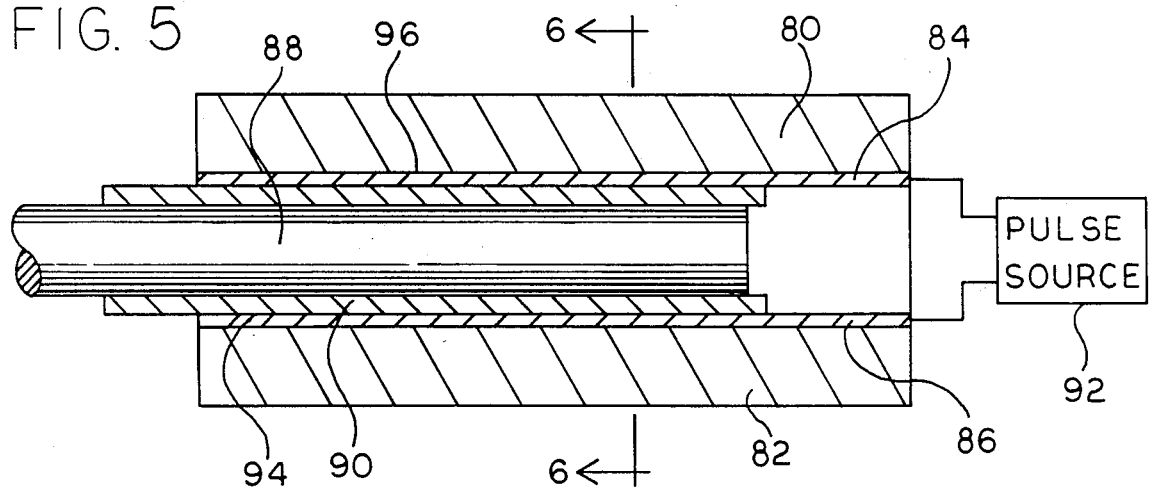
FIG. 5 is a view in longitudinal section of an alternative embodiment of the invention.
Figure 6:
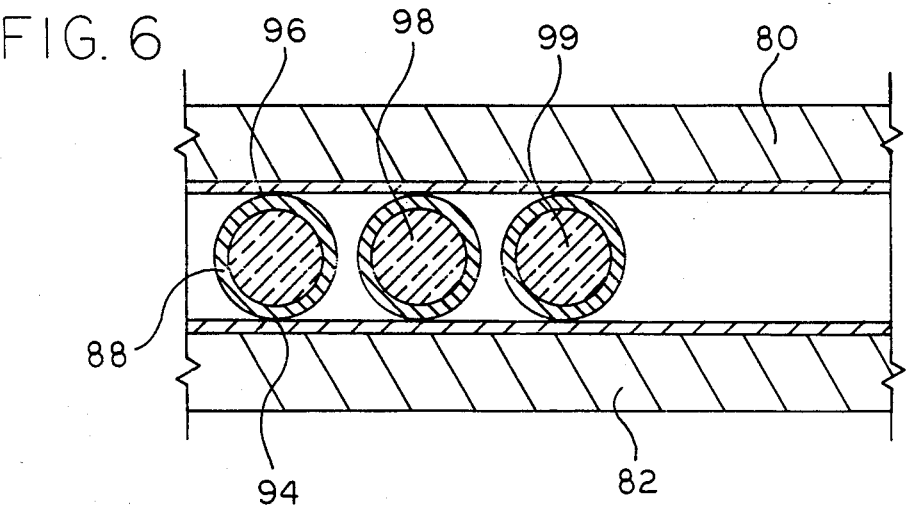
FIG. 6 is a view in lateral section taken substantially along the line 6—6 of FIG. 5.

Referring to FIG. 5, a substrate plate 80 and a similar substrate plate 82 are coated respectively with metallic layers 84 and 86. An optical fiber 88 has a metallic layer 90 formed about its periphery in the manner described above. As illustrated in FIG. 6, a plurality of such optical fibers, like the optical fiber 88, may be sandwiched between the coated substrate 80 and 82 and welded in position in accordance with the present invention. As shown in FIG. 5, the pulse source 92 may be connected between the metallic layer 84 and the metallic layer 86 so that the welding current pulse travels through both electrical contact interfaces 94 and 96 and the corresponding interfaces for the other fibers 98 and 99. The fibers are thus accurately and rigidly held in position for coupling with other devices.

In order to minimize the tendency of fibers to offset and misalign during the welding operation, one or more support beams may be formed longitudinally along the fibers. Referring to FIGS. 7-10, an array of fibers 102, 104, 106, and 108 are mounted on a support plate 110 and potted with a potting compound 112 to form a temporary protective layer. They are then lapped longitudinally so that a longitudinal flat or band, such as flat 114, is exposed along the periphery of the fiber as illustrated in FIG. 8. A metallic layer, such as metallic layer 116, is then deposited and/or plated upon this exposed band to form a metallic support beam, such as beam 116, in accordance, for example, with conventional electrodeposition and/or electroplating techniques.

After the beam is formed, the fibers are unpotted, as illustrated in FIG. 9, and then may be coated around the remainder of their periphery with a metallic layer 118 as illustrated in FIG. 9.

As an alternative, illustrated in FIG. 10, a pair of bars 120 and 122 may be formed using the same technique on an optical fiber 124. More bars may additionally be formed as desired. The bars may also be made to extend from the endface of the fibers in the manner analogous to the lip 16 illustrated in FIG. 3. The resulting metal bar or bars will decrease the tendency of the fiber to offset during the weld process.

Figure 12:
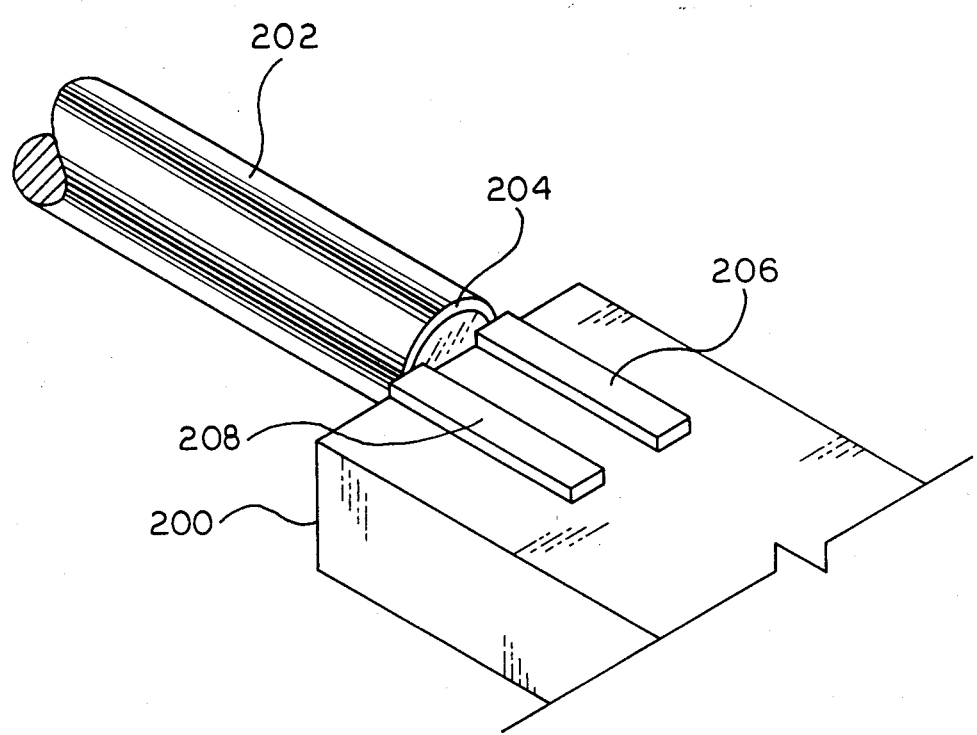
FIG. 12 is a view in perspective of an alternative embodiment of the invention.

Referring to FIG. 12, the metal coated counter-surface 200 to which the metal-coated fiber 202 is to be welded does not have to be a continuous film. The rim 204 of the fiber 202 can be made to weld to one or more metal film rods 206 and 208 formed on a surface perpendicular to the desired counter-surface as illustrated in FIG. 12.

Many different metals and metal alloys may be used with the present invention. These include, for example, gold and indium alloys. Gold has a higher melting temperature and therefore requires higher welding currents. Indium, and its many alloys, have lower melting temperatures and correspondingly lower welding currents. Since indium wets or reacts with gold, indium-gold combinations are also possible. Generally, metals and metal alloys with melting temperatures between 50 degrees C and 1500 degrees C are useful with the present invention. These include not only gold and its alloys with or without adhesive layers, such as chromium or titanium, but also indium and its alloys, such as indium-tin, indium-silver, and indium-lead. Also useful are silver and its alloys, copper and its alloys, aluminum and its alloys, nickel and its alloys, zinc and its alloys, iron and its alloys, titanium and its alloys, and zirconium and its alloys. Nickel gold alloys may be particularly useful because they are much stronger than gold alone. Accordingly, substantial improvement in bond strength is possible by using an alloy.

In addition, fluxes which are suitable for the metals being used are also useful with the present invention.

EXPERIMENTAL RESULTS

All fibers were standard 125 micron diameter single-mode silica-based fibers. They were coated by e-beam evaporation with a thin adhesive chromium layer (10–1000 angstroms) followed (as is standard practice, without breaking vacuum) by 1000–5000 Angstroms of pure gold. Following this they were cleaved to produce a flat perpendicular endface, and electroplated, either in commercially obtained gold or indium alloy plating solutions to final thicknesses of 1–50 microns, with 5 microns nominal.

Reverse polarity unplating (electropolishing) was performed to remove anomalous plating features or to shape the fiber's plated lip.

EXPERIMENT 1

Numerous gold-plated fibers, nominally 3–5 microns of final metal thicknesses were bonded to gold film having thicknesses on glass and on silicon of 5000 Angstroms or less. Successful bonds were obtained by discharging an 11,000 microfarad capacitor, previously charged to 4–10 volts, through typical contact and series resistances of 0.5 to 2 ohms. Bonds were initiated by methods described above, bringing the fiber into contact and discharging by means of a switch, and by discharging the circuit via moving the fiber into contact. During this discharge, the fiber was advanced forward with a piezoelectric transducer. The forward force was no less than 2.5 grams. Roughly equivalent results were seen. Bond strength was measured in each case by pulling the bonded fiber directly along its longitudinal axis until bond failure. Strengths as high as 7.5 grams have been obtained. Best results have been obtained by a two-step discharge process, the first step a low voltage discharge to produce a weak bond, followed by a second higher voltage discharge to increase adhesion. In each case the bond region was observed visually via a long working distance microscope objective, TV camera, and TV monitor. No evidence of fiber motion misalignment during the bonding operation was observed.

EXPERIMENT 2

Numerous indium plated fibers, nominally 5–20 microns of final metal thicknesses, were bonded to gold and indium coated counter-surfaces. Counter-surface metal film thicknesses were approximately 5000 Angstroms or less. Successful bonds were obtained as above, but with somewhat lower voltages (1–5 volts). Pull strengths of 2–4 grams are common, with one very thick coating (50 microns) yielding 11 grams. Higher strengths should accompany optimized welding conditions. As with the gold-to-gold bonding described above, no evidence of fiber motion during the bonding operation was observed.

EXPERIMENT 3

Numerous gold plated fibers were lightly electroplated with indium and bonded to gold plated counter surfaces. As above, bond strengths as high as 25 grams were observed for the two-step process mentioned.

EXPERIMENT 4

Numerous gold-plated fibers with 3–5 micron nominal coating thicknesses were bonded longitudinally to 5000 Angstrom gold-coated glass plates over contact lengths as long as 1 cm. These fibers were attached securely enough to the plate after bonding that the plate could be hand-held with the fiber and electrical contact wire dangling. These bonds were made by discharging 15 volts between a fiber held in contact with gold-coated plates by the weight of a standard glass microscope slide plus a 10 gram weight. No evidence of arcing or obvious fiber movement was observed. Another configuration was found useful. A metal rod with a 1 mm dia glass tip was used to press the metal coated fiber into a metal coated counter-surface. Weights of 10–20 grams were placed on this rod. A two step discharge current was applied through the fiber's coating and the counter-surface. Adhesion strengths of 20–50 grams have been recorded.

CONCLUSION

Therefore, in accordance with the present invention, single or multi-mode optical fibers may be attached to the floors and/or walls of delineated troughs, channels, grooves, or spaces. Such structures may be created in bulk or deposited silicon, silica or other substances by delineation or patterning using chemical etching, plasma etching, ion beam milling, reactive ion etching, reactive ion beam milling, and/or other conventional film delineation processes.

The fibers can be individually bonded in sequence to form arrays of individually aligned and bonded optical fibers. Alternatively, they can be formed as pre-assembled arrays, and attached as a group by this method.

The method can be used to position or secure an optical fiber or an etched drawn and/or tapered optical fiber on a metallized flat or within an etched, formed, or milled trench, groove, space, or channel in a glass or crystalline substrate where the etched trench, groove, space, or channel terminates at or near the entrance to an optical wave guide, single or multi-mode.

The method of the present invention may be used to accomplish the welding of single or multi-layer thin film metal or metal alloy coated optical fibers, single or multi-mode type, to any other single or multi-layer thin film metal or metal alloy coated structure, including silicon micro-electronics, gallium arsenide or III–V based alloy substrates and devices, metal blocks, rectangular or V-type grooves in any substrate, glass lenses, electrooptic substrates, electrooptic waveguide circuit substrates and other similarly coated optical fibers.

While certain preferred embodiments of the present invention have been disclosed in detail, it is to be understood that various modifications may be adopted without departing from the spirit of the invention or scope of the following claims. The method is conceived as a general means for the microattachment of thin film metal coated parts.

We claim:

1. A method for bonding an optical fiber to an object having a metal surface, comprising:

(a) coating at least a portion of the periphery of the optical fiber with a metallic layer in the area of the fiber where bonding is to take place;
(b) positioning said metallic layer in electrical contact with the metal surface of said object along an interface between the fiber and the object; and
(c) applying at least one preselected and controlled electrical current pulse through said interface sufficient to cause local melting of the metallic surfaces and welding at the interface.

2. A method in accordance with claim 1 wherein said metallic layer and said object are connected respectively by electrically conductive paths to a different one of the terminals of a capacitor before being brought into said electrical contact and wherein the contact completes a discharge circuit to initiate a capacitive discharge.

3. A method in accordance with claim 1 wherein said current pulse is controlled to apply the pulse for a selected time duration.

4. A method in accordance with claim 1 wherein said current pulse is controlled to apply a selected average electrical energy over a selected pulse duration.

5. A method in accordance with claim 1 wherein an additional electric current is also applied to one of said metallic layer, said object and the combination of said metal layers and said object.

6. A method in accordance with claim 5 wherein said additional electric current is applied during said electrical current pulse.

7. A method in accordance with claim 6 wherein a plurality of said pulses are applied through said interface during application of said additional electric current.

8. A method in accordance with claim 1 wherein said peripheral metallic layer is formed to extend longitudinally beyond the end face of the fiber.

9. A method in accordance with claim 8 wherein said metallic layer is formed to extend entirely around the periphery of the fiber to form a longitudinally protruding rim.

10. A method in accordance with claim 1 or 2 or 3 or 4 or 5 or 6 or 7 or 8 or 9 wherein said metallic layer is formed by first depositing on the fiber a thin film of a selected metal having a thickness substantially within the range of 10 Angstroms to 7500 Angstroms and then plating the thin film with a metal layer to a thickness substantially in the range of 1 micron to 50 microns.

11. A method in accordance with claim 1 or 2 or 3 or 4 or 5 or 6 or 7 or 8 or 9 wherein said object is a second optical fiber which is first coated over at least a portion of its periphery with a metallic layer and said fibers are brought into conductive contact in longitudinal alignment.

12. A method in accordance with claims 1 or 2 or 3 or 4 or 5 or 6 or 7 or 8 or 9 wherein a plurality of said current pulses are applied in time sequence through said interface.

13. A method in accordance with claim 12 wherein the first current pulse is relatively smaller than each subsequent current pulse for initially tacking said fiber to said object and subsequently more securely bonding said fiber to said object.

14. A method in accordance with claim 12 wherein the first pulse warms the metal in the region of the interface near its melting temperature and a subsequent pulse welds said fiber to said object.

15. A method in accordance with claim 1 or 3 or 4 or 5 or 6 or 7 or 8 or 9 wherein a force having a component along the fiber axis is applied to the fiber during application of the current pulse to press its end into contact with said object.

16. A method in accordance with claim 1 or 2 or 3 or 4 or 5 or 6 or 7 or 8 or 9 wherein after said welding a bonding agent is coated over said weld, a portion of said fiber metallic layer adjacent said weld and a portion of the surface of said object adjacent said weld.

17. A method in accordance with claim 1 or 2 or 3 or 4 or 5 or 6 or 7 or 8 or 9 wherein the metallic layer of said fiber is positioned in electrical contact with a metallic surface of said object for forming a weld longitudinally along the periphery of the fiber to said object surface.

18. A method in accordance with claim 17 wherein said object has a planar surface and wherein, after said fiber is welded to said planar surface the method is repeated to weld the fiber to a second metallic surface.

19. A method in accordance with claim 1 or 2 or 3 or 4 or 5 or 6 or 7 or 8 or 9 wherein said metallic layer is formed along a longitudinal band upon the periphery of the optical fiber to form a metallic support beam.

20. A method in accordance with claim 1 or 2 or 3 or 4 or 5 or 6 or 7 or 8 or 9 wherein prior to coating the fiber with a metallic layer, said fiber is partially coated with a temporary protective layer with at least one longitudinal band exposed along the periphery of the fiber and wherein a metallic layer is coated upon said band to form a metallic support beam and thereafter said protective layer is removed.

21. A method in accordance with claim 20 wherein said fiber is coated by first potting said fiber in position upon a plate and then longitudinally lapping the fiber to expose a flat longitudinal band for receipt of said metallic layer.

* * * * *